United States Patent [19]

St. Clair et al.

[11] Patent Number: 4,603,061

[45] Date of Patent: Jul. 29, 1986

[54] PROCESS FOR PREPARING HIGHLY OPTICALLY TRANSPARENT/COLORLESS AROMATIC POLYIMIDE FILM

[75] Inventors: Anne K. St. Clair; Terry L. St. Clair, both of Poquoson, Va.

[73] Assignee: The United States of America as represented by the National Aeronautics and Space Administration, Washington, D.C.

[21] Appl. No.: 643,589

[22] Filed: Aug. 23, 1984

[51] Int. Cl.$^4$ .......................... B05D 5/06; B32B 27/00
[52] U.S. Cl. ................................... 427/162; 264/212; 264/236; 427/164; 427/165; 427/168; 428/336; 428/473.5
[58] Field of Search .............................. 428/473.5, 336; 264/212, 236; 427/162, 164, 165, 168

[56] References Cited

U.S. PATENT DOCUMENTS 4,378,400  3/1983  Makino et al. ................... 428/473.5
4,485,140  11/1984  Gannett et al. ................... 428/473.5

FOREIGN PATENT DOCUMENTS 107897  5/1984  European Pat. Off. ......... 428/473.5

Primary Examiner—Thomas J. Herbert
Attorney, Agent, or Firm—Howard J. Obsorn; John R. Manning; Wallace J. Nelson

[57]     ABSTRACT

An aromatic condensation polyimide film that is approximately 90% transparent at 500 nm, useful for thermal protective coatings and the like and the process for preparing same are disclosed. An essential feature of the invention for achieving maximum optical transparency films requires utilizing recrystallized and/or sublimated specific aromatic diamines and dianhydride monomers and introducing bulky electron-withdrawing groups and separator groups into the polymer molecular structure. The incorporation of bulky electron-withdrawing groups in the diamine portion of the polymer structure serves to reduce the formation of inter-chain and intra-chain charge transfer complexes which normally cause large absorptions in the UV-visible range. Incorporation of separator atoms into either the diamine or dianhydride monomers serves to reduce the amount of conjugation and inter-and intra-chain electronic interactions and thereby lessen charge transfer complex formation.

13 Claims, No Drawings

PROCESS FOR PREPARING HIGHLY OPTICALLY TRANSPARENT/COLORLESS AROMATIC POLYIMIDE FILM

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

Linear aromatic condensation polyimide film is a material of choice for use in many aerospace as well as commercial applications where long term durability at temperatures in the range of 200° C.–300° C. are needed and where shorter times at temperatures exceeding 300° C. are necessary. Because of their inherent toughness and flexibility, low density, remarkable thermal stability, radiation resistance and mechanical strength, aromatic polyimide films have excellent potential for use as materials on large space structures.

The need exists for high temperature, flexible polymeric film and coating materials that have high optical transparency in the the 300–600 nm range of the electromagnetic spectrum for applications on such space components as antennae, solar cells and thermal control coating systems. Although there are available several classes of polymers which are transparent/colorless such as polyesters or aliphatic polyimides, these materials have limited long term thermal stability. A major drawback for using the thermally stable aromatic polyimides for the above stated space applications has been their poor transparency in the visible range of the electromagnetic spectrum. Traditionally, linear all-aromatic condensation polyimides are known for their bright yellow color. Commercial aromatic polyimide film has been evaluated for applications on space solar cells and thermal control coating systems but was found to be only about 70% transparent (depending on thickness) at the solar wavelength of interest of interest (500 nm). A further drawback for using the intensely colored aromatic polyimides as space films or coatings is that although they are approximately 70% transparent, upon aging in a space environment they become even less transparent (as low as 30% transparent).

By the present invention, aromatic condensation polyimide films are produced which are essentially colorless to totally colorless. These materials provide 90% transparency at the visible wavelength of 500 nm compared to 60–70% transparency for commercial polyimide film of the same thickness. It is anticipated that these optically transparent/achromatic films will prove highly useful as film and coating materials for aerospace applications where high transparency and thermal stability are necessary criteria. This improvement in transparency has been made without sacrificing other advantageous polymer properties.

Accordingly, an object of the present invention is to provide a process for increasing the optical transparency of linear aromatic condensation polyimide film.

Another object of the present invention is to provide a process for preparing aromatic polyimides for use as films and/or coatings having improved optical transparency at wavelengths in the visible region of the electromagnetic spectrum useful for transmitting solar energy as needed in such applications as solar cell covers or second surface mirror coatings in thermal control coating systems.

A further object of the present invention is an aromatic polyimide with improved optical transparency.

BRIEF DESCRIPTION OF THE INVENTION

According to the present invention, the foregoing and additional objects are attained by providing a method by which linear aromatic condensation polyimide films are made highly optically transparent (90% transparent at 500 nm). The process for producing optically transparent aromatic polyimide films according to the present invention involves two conditions: (1) purification of both aromatic diamine and aromatic dianhydride monomers and the solvent used as a medium; and (2) separation and/or removal of chromaphoric centers and reduction of both inter- and intra-chain electronic interactions which cause absorption in the UV-visible range by introducing bulky electron-withdrawing groups and "separator" groups into the polymer molecular structure. Both of these conditions must be used simultaneously or concurrently to produce polyimide films with maximum optical transparency.

In regard to the first condition, at least one recrystallization and/or sublimation of the aromatic diamine and dianhydride monomers was necessary to prevent impure starting materials from discoloring the final polyimide film. It was also necessary to use distilled solvent as a reaction medium.

The second condition necessary for providing maximum optical transparency includes the use of bulky electron-withdrawing groups in the monomers of the present invention such as $-CF_3$ or $SO_2$ groups and "separator" groups such as $-O-$ linkages which can reduce electron affinity and overall conjugation in the polymer chain. Incorporation of electron withdrawing groups in the diamine portion of the polymer structure is particularly beneficial in reducing the formation of inter-chain and intra-chain charge transfer complexes which cause large absorptions in the UV-visible range. Incorporation of large, bulky groups into either the diamine or dianhydride monomers reduce the amount of chain-to-chain electronic interactions and thereby lessens charge transfer complex formation.

Preparation of highly optically transparent and/or colorless polyimide film of the present invention involves the conventional reaction of an aromatic diamine in a solvent with an aromatic dianhydride but with highly purified monomers and molecular structures according to the following:

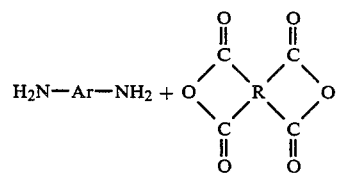

Room temp in
amide solvent
15% w/w solids

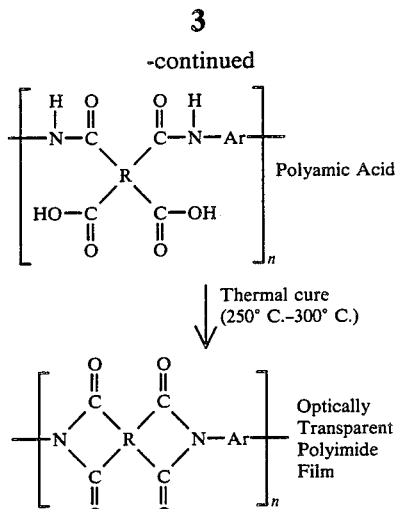

Polyamic Acid

Thermal cure
(250° C.–300° C.)

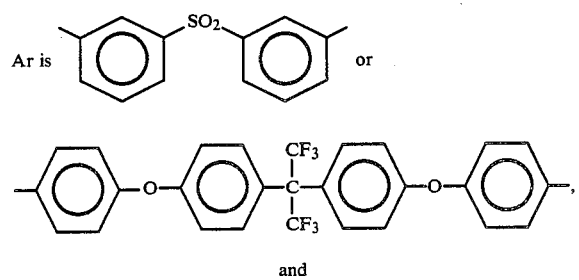

Optically Transparent Polyimide Film where n is 5 to 100

Ar is

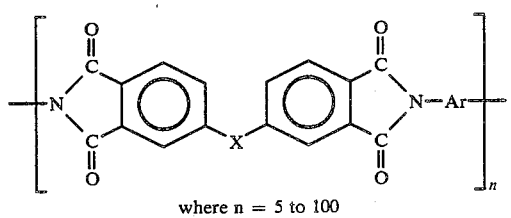

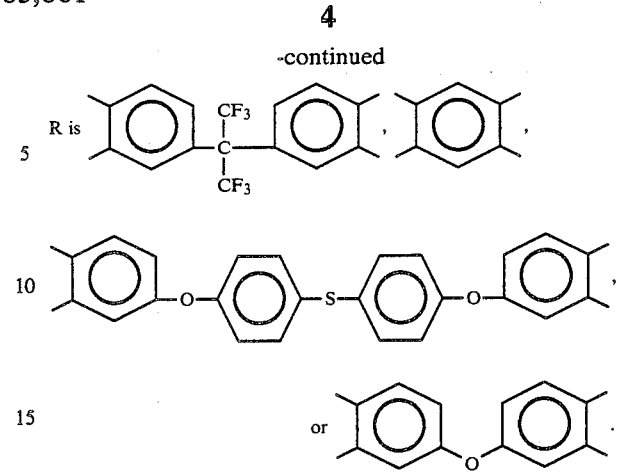

In the above reaction, a highly purified aromatic diamine is dissolved in a distilled amide type solvent such as dimethylacetamide (DMAc). A highly purified dianhydride is then added to the diamine solution at room temperature to form a polyamic acid. This resin is then spread onto a glass plate to form a film using a doctor blade with specified blade gap. The polyamic acid film is then thermally converted to the polyimide by heating to 300° C.

Although one of the aromatic diamines (DDSO$_2$) of the present invention involved the use of a meta-oriented linkage in conjunction with an electron-withdrawing group, other meta-linked diamines in combination with the same dianhydride did not produce a colorless film (See Table I).

TABLE I
AROMATIC POLYIMIDE FILM where n = 5 to 100

| POLYMER | DIANHYDRIDE —X— | DIAMINE —Ar— | PHYSICAL APPEARANCE |
|---|---|---|---|
| 6F + DDSO$_2$ (Example I) | —C(CF$_3$)$_2$— | (m-SO$_2$-m diphenyl) | Colorless |
| 6F + BDAF (Example IV) | —C(CF$_3$)$_2$— | (phenyl-O-phenyl-C(CF$_3$)$_2$-phenyl-O-phenyl) | Very Pale Yellow to Colorless* |
| 6F + DABP (4,4'-) | —C(CF$_3$)$_2$— | (4,4'-diaminobenzophenone) | Light Yellow |
| 6F + DABP (3,3'-) | —C(CF$_3$)$_2$— | (3,3'-diaminobenzophenone) | Light Yellow |
| 6F + MDA (4,4'-) | —C(CF$_3$)$_2$— | (4,4'-methylenedianiline) | Yellow |
| 6F + MDA (3,3'-) | —C(CF$_3$)$_2$— | (3,3'-methylenedianiline) | Yellow |

TABLE I-continued

AROMATIC POLYIMIDE FILM

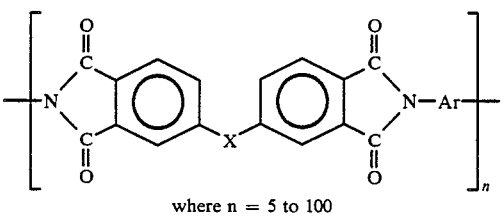

where n = 5 to 100

| POLYMER | DIANHYDRIDE —X— | DIAMINE —Ar— | PHYSICAL APPEARANCE |
|---|---|---|---|
| 6F + ODA | —C(CF$_3$)$_2$— | —⌬—O—⌬— | Light Yellow |
| BDSDA + DDSO$_2$ (Example II) | —O—⌬—S—⌬—O— | ⌬—SO$_2$—⌬ | Very Pale Yellow to Colorless* |
| BDSDA + BDAF (Example V) | —O—⌬—S—⌬—O— | —⌬—O—⌬—C(CF$_3$)$_2$—⌬—O—⌬— | Very Pale Yellow to Colorless* |
| BDSDA + DABP | —O—⌬—S—⌬—O— | —⌬—C(=O)—⌬— | Light Yellow |
| BDSDA + MDA | —O—⌬—S—⌬—O— | —⌬—CH$_2$—⌬— | Yellow |
| BDSDA + ODA | —O—⌬—S—⌬—O— | —⌬—O—⌬— | Light Yellow |

*Color dependent upon thickness

The other aromatic diamine of the present invention (BDAF) involved the use of oxygen "separator" bridges and a bulky —C(CF$_3$)$_2$—group but does not produce a colorless polyimide film with just any dianhydride (See BTDA+BDAF and PMDA+BDAF in Table II).

TABLE II

AROMATIC POLYIMIDE FILM

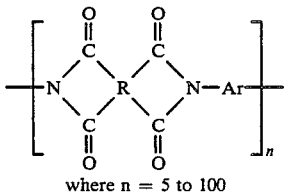

where n = 5 to 100

| POLYMER | DIANHYDRIDE R | DIAMINE —Ar— | PHYSICAL APPEARANCE |
|---|---|---|---|
| BTDA + DDSO$_2$ | ⌬—C(=O)—⌬ | ⌬—SO$_2$—⌬ | Light Yellow/ Orange |
| BTDA + BDAF | ⌬—C(=O)—⌬ | —⌬—O—⌬—C(CF$_3$)$_2$—⌬—O—⌬— | Yellow |
| BTDA + DABP (4,4'-) | ⌬—C(=O)—⌬ | —⌬—C(=O)—⌬— | Yellow |
| BTDA + DABP (3,3'-) | ⌬—C(=O)—⌬ | ⌬—C(=O)—⌬ | Yellow |

TABLE II-continued
AROMATIC POLYIMIDE FILM

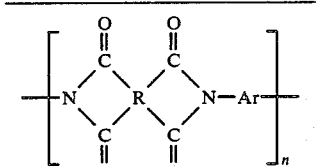

where n = 5 to 100

| POLYMER | DIANHYDRIDE R | DIAMINE —Ar— | PHYSICAL APPEARANCE |
|---|---|---|---|
| BTDA + MDA (4,4'-) | ⟨benzophenone dianhydride core⟩ | —⌬—CH₂—⌬— | Yellow |
| BTDA + MDA (3,3'-) | ⟨benzophenone dianhydride core⟩ | ⟨3,3'-MDA⟩ | Yellow |
| BTDA + ODA | ⟨benzophenone dianhydride core⟩ | —⌬—O—⌬— | Yellow |
| BTDA + PDA | ⟨benzophenone dianhydride core⟩ | —⌬— | Yellow |
| PMDA + DDSO₂ (Example III) | ⟨PMDA core⟩ | ⟨Ar with SO₂⟩ | Very Pale Yellow |
| PMDA + BDAF | ⟨PMDA core⟩ | —⌬—O—⌬—C(CF₃)₂—⌬—O—⌬— | Orange/Yellow |
| PMDA + DABP | ⟨PMDA core⟩ | —⌬—C(=O)—⌬— | Yellow |
| PMDA + MDA | ⟨PMDA core⟩ | —⌬—CH₂—⌬— | Yellow |
| PMDA + ODA | ⟨PMDA core⟩ | —⌬—O—⌬— | Yellow |
| PMDA + PDA | ⟨PMDA core⟩ | —⌬— | Yellow |

Although the use of the dianhydride of the present invention having the bulky electron-withdrawing —C(CF₃)— group (6F) can produce more lightly colored polyimide films than usual with diamines other than those of the present invention (6F+4,4'-DABP; 6F+3,3'-DABP; or 6F+ODA in Table I), reaction with the DDSO₂ or BDAF diamines was necessary to produce truly colorless or essentially colorless films.

Although the use of dianhydrides BDSDA and ODPA having oxygen and sulfur separator groups present in their molecular structure are used in the present invention, other aromatic dianhydrides with separator groups efficient in reducing inter- or intra-chain electronic interactions could foreseeably be used with the DDSO₂ or BDAF diamines to produce highly transparent films. Although the BDSDA in combination with other diamines such as DABP or ODA (Table I) produce more lightly colored films than the traditional bright yellow color, only the combination with DDSO₂ or BDAF of the present invention produced pale yellow to colorless films. Although ODPA dianhydride has been used to produce lighter yellow colored films than is conventional, only combination with the BDAF diamine of the present invention yielded a colorless film (Table III).

TABLE III
AROMATIC POLYIMIDE FILM

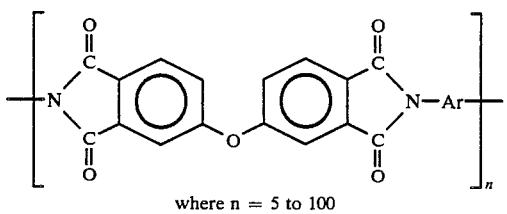

where n = 5 to 100

| POLYMER | DIAMINE —Ar— | PHYSICAL APPEARANCE |
|---|---|---|
| ODPA + BDAF (Example VI) | —⌬—O—⌬—C(CF$_3$)$_2$—⌬—O—⌬— | Very Pale Yellow to Colorless* |
| ODPA + DDSO$_2$ | ⌬—SO$_2$—⌬ (meta) | Yellow |
| ODPA + DABP | —⌬—C(=O)—⌬— | Light Yellow |
| ODPA + MDA | —⌬—CH$_2$—⌬— | Yellow |
| ODPA + ODA | —⌬—O—⌬— | Yellow |
| ODPA + PDA | —⌬— | Yellow |

The use of PMDA dianhydride does not offer any mechanism by itself to reduce polymer electronic interactions, but the combination of this dianhydride with DDSO$_2$ diamine of the present invention produces a very pale yellow colored film, highly transparent in the visible region of the electromagnetic spectrum. It is exceedingly unusual for PMDA to form any other than a bright yellow or orange film (See Table II for examples) and is thus included in the present invention.

It should be noted that the combination of 6F+DDSO$_2$ provided the most colorless (water-white) film of the present invention. This is explainable in that both monomers provide a mechanism for reduction of both inter- and intra-chain electronic interactions and therefore an overall reduction in charge transfer complex formation.

Although the bulky electron-withdrawing —C(CF$_3$)—groups in the 6F dianhydride and BDAF diamine of the present invention were employed in the specific examples for producing colorless films in combination with certain specific monomers, other dianhydride or diamine monomers containing equally bulky and/or electron deficient groups could be used (i.e, —CH(C$_6$H$_{11}$)—, or —P(O)R— where R=phenyl, methyl, ethyl, etc.).

Optical transparency of the films of the present invention was determined not only by physical appearance but by transmission UV-visible spectroscopy. Spectra of 0.2 mil thick films of the present invention showed strong absorptions with cut-offs located between 300 and 400 nm (UV region) compared to a cut-off between 450 and 500 nm (visible region) for a commercial polyimide film (Kapton ®) of the same thickness. Polymers prepared from the 6F dianhydride absorbed at the lower wavelengths and correspondingly had the highest optical transparency over the broadest range.

As evidenced by the UV-visible studies described above, the use of highly purified dianhydride and diamine monomers containing bulky electron deficient and/or separator groups in their molecular structure was a successful process for reducing chromaphoric centers, conjugation and overall charge transfer complex formation due to either or both inter- and intramolecular electronic interactions. As a result of this process, high optical transparency was obtained for a variety of aromatic condensation polyimides. Films have been prepared by the process of the present invention which are very pale in color to completely colorless compared to the bright yellow color of conventional/commercial aromatic polyimide film. This increased transparency in aromatic polyimides has been achieved at no sacrifice in thermal stability, flexibility, toughness, or mechanical properties. These features make the films of the present invention extremely attractive as films or coating materials for aerospace applications. They should also be useful for any other commercial applications where high optical transparency and/or thermal stability are needed requirements.

SPECIFIC EXAMPLES

Example I

To a clean, dry vessel, was added 1.2415 g (0.005 mole) of recrystallized and vacuum dried 3,3'-diaminodiphenylsulfone (DDSO$_2$) (m.pt. 172° C.) and 19.6 g dimethylacetamide (DMAc) which had been vacuum distilled at 102° C. over calcium hydride. After stirring the diamine solution for several minutes, 2.2211 g (0.005 mole) of recrystallized and sublimed (m.pt.

243.5° C.) 2,2-bis(3,4-dicarboxyphenyl)hexafluoropropane dianhydride (6F) was added all at once. Melting points of monomers were determined by differential thermal analysis at 10° C./min for this Example and subsequent Examples. Stirring was continued after capping the solution with dry nitrogen until all dianhydride had dissolved and a solution inherent viscosity of 0.5 dl/g at 35° C. was obtained. The resulting polyamic acid solution (15% solids w/w) was refrigerated until used for film casting.

Films of the 6F+DDSO2 polyamic acid were prepared by casting the resin onto a soda-lime glass plate in a dust-free chamber at a relative humidity of 10%. The solution was spread by an aluminum blade with gaps set so as to ensure final film thicknesses ranging from 0.2 to 1.0 mil. The polyamic acid films on the glass plates were thermally converted to the corresponding polyimide by heating in a forced air oven for one hour each at 100°, 200° and 300° C. The resulting polyimide films were removed from the glass plates after cooling to room temperature by immersion in warm water. The 6F+DDSO2 films were totally colorless in appearance, flexible and soluble in chlorinated and amide-type organic solvents.

Example II

By the same method and conditions as described in Example I of the present invention, 4.0839 g of 4,4'-bis(3,4-dicarboxyphenoxy)diphenyl sulfide dianhydride (BDSDA) (m.pt. 191° C.) was added to 1.9864 g DDSO2 dissolved in 34.4 g DMAc to form a polyamic acid resin having an inherent viscosity of 0.4 dl/g. Resulting polyimide films of the BDSDA+DDSO2 polymer ranged from nearly colorless (0.2 mil thick) to very pale yellow (1 mil) in appearance. The films were flexible and soluble in amide-type solvents.

Example III

Using the same method and conditions as described in Example I of the present invention, 3.0537 g of sublimed pyromellitic dianhydride (PMDA) (m.pt. 284° C.) was added to 3.4763 g DDSO2 dissolved in 37.0 g DMAc to form a polyamic acid resin having an inherent viscosity of 0.5 dl/g. Resulting polyimide films of the PMDA+DDSO2 polymer were very pale yellow in color at 1 mil thickness, flexible and partly soluble in amide-type solvents.

Example IV

By the same method and conditions as described in Example I of the present invention, 0.8885 g 6F was added to 1.0369 g of recrystallized 2,2-bis[4(4-aminophenoxy)phenyl]hexafluoropropane (BDAF) (m.pt. 162° C.) dissolved in 10.9 g DMAc to form a polyamic acid resin having an inherent viscosity of 1.0 dl/g. Resulting polyimide films of the 6F+BDAF polymer were colorless at 0.2 mil thickness and very pale yellow at 1.0 mil thickness. The films were flexible and soluble in both chlorinated and amide-type solvents.

Example V

Using the same method and conditions as described in Example I of the present invention, 3.0629 g of BDSDA (Example 2) was added to 3.1108 g BDAF (Example IV) dissolved in 35 g DMAc to form a polyamic acid resin having an inherent viscosity of 1.3 dl/g. Polyimide films prepared from the BDSDA+BDAF resin were essentially colorless at 0.2 mil thick and very pale yellow in color at 1.0 mil thick. The films were flexible and soluble in ether, chlorinated and amide-type solvents.

Example VI

By the same method and conditions as described in Example I of the present invention, 2.1715 g of sublimed 4,4'-oxydiphthalic anhydride (ODPA) (m.pt. 224° C.) was added to 3.6292 g BDAF (Example IV) dissolved in 32.9 g DMAc to form a polyamic acid resin having an inherent viscosity of 1.1 dl/g. Polyimide films prepared from this ODPA+BDAF resin were essentially colorless at 0.2 mil thick and very pale yellow in color at 1.0 mil thick. The films were flexible and partly soluble in ether, chlorinated and amide-type solvents.

In each of the described Examples, the polyamic acid solutions may be employed as made, or by diluting with the same or other solvents, to be applied by hand, brush or sprayed onto a desired surface and thermally cured in the temperature range of 250° C.-300° C. for at least one hour to produce a highly optically transparent polyimide coating surface.

The foregoing specific Examples are exemplary and are not to be considered as exhaustive but merely to illustrate the invention without serving as limitations thereon.

What is claimed as new and desired to be secured by Letters Patent of the United States is:

1. A method for preparing a high temperature, highly optically transparent-to-colorless aromatic polyimide film comprising:
   chemically reacting equimolar quantities of
   (1) a highly purified aromatic diamine and
   (2) a highly purified aromatic dianhydride, in a solvent medium to form a high molecular weight polyamic acid solution,
   at least one of the highly purified, aromatic diamine and the highly purified aromatic dianhydride containing a bulky electron-withdrawing group in the monomer molecular structure,
   applying a desired thickness film layer of the polyamic acid solution onto a surface,
   thermally curing the applied film in the temperature range of 250° C. to 300° C. for at least one hour to yield an optically transparent polyimide film layer.

2. The method of claim 1 wherein the highly purified aromatic diamine is selected from the group consisting of recrystallized:
   3,3'-diaminodiphenylsulfone, and
   2,2-bis[4-(4-aminophenoxy)phenyl]hexafluoropropane.

3. The method of claim 1 wherein the highly purified aromatic dianhydride is selected from the group consisting of recrystallized and/or sublimed:
   2,2-bis(3,4-dicarboxyphenyl)hexafluoropropane dianhydride,
   4,4'-bis(3,4-dicarboxyphenoxy)diphenyl sulfide dianhydride,
   4,4'-oxydiphthalic anhydride, and
   pyromellitic dianhydride.

4. The method of claim 1 wherein the solvent is distilled prior to use and is selected from one or more of the group consisting of:
   N,N-dimethylacetamide,
   N,N'-dimethylformamide,
   N-methyl-2-pyrrolidone, and
   dimethylsulfoxide.

5. The method of claim 1 wherein the applied polyamic film layer is cast onto a glass plate and the recovered cured optically transparent polyimide film is stripped from the glass for use thereof.

6. The method of claim 1 wherein the applied polyamic acid film layer is approximately 15% w/w solids and is applied by brush coating onto a surface and the cured optically transparent polyimide film layer serves as thermal protection for the surface.

7. The method of claim 1 wherein the polyamic acid solution is 15% w/w solids and including the further step of diluting the polyamic acid solution by adding additional solvent thereto prior to applying a film layer thereof onto a surface and wherein the applied film layer is sprayed onto the surface and the cured resulting transparent polyimide serves as a thermal protection layer for the surface.

8. A method for preparing a high temperature, highly optically transparent-to-colorless aromatic polyimide film comprising:
   chemically reacting equimolar quantities of
   (1) a highly purified aromatic diamine, and
   (2) a highly purified aromatic dianhydride in a solvent medium to form a high molecular weight polyamic acid solution,
   at least one of the reacted diamine and the dianhydride containing separator linking atoms in the monomer molecular structure,
   applying a controlled thickness film layer of the polyamic acid solution onto a surface, and
   thermally curing the applied film layer in the temperature range of 250° C. to 300° C. for at least one hour to yield the optically transparent polyimide film layer.

9. The method of claim 8 wherein the highly purified aromatic diamine has a formulation of:

$H_2N-Ar-NH_2$ where Ar is selected from the group consisting of:

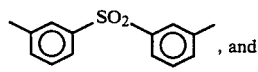

, and

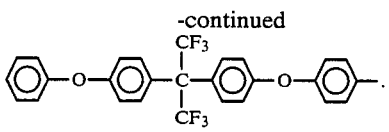

10. The method of claim 8 wherein the highly purified aromatic dianhydride has a formulation of:

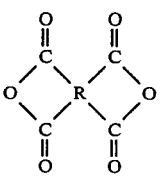

where R is selected from the group consisting of:

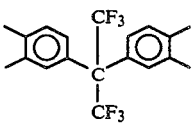

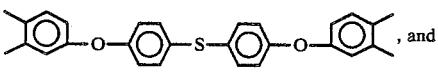, and

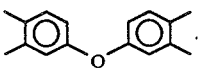

11. An aromatic condensation polyimide film having the inherent physical property characteristics of being essentially colorless-to-totally colorless and providing approximately 90% transparency at 500 nm when prepared in the film thickness range of 0.2 to 1.0 mil.

12. A highly optically transparent-to-colorless aromatic polyimide film having a film thickness range of 0.2 to 1.0 mil and prepared according to the process of claim 1.

13. A highly optically transparent-to-colorless aromatic polyimide film having a film thickness range of 0.2 to 1.0 mil and prepared according to the process of claim 8.

* * * * *